United States Patent
Son

(10) Patent No.: US 6,323,761 B1
(45) Date of Patent: Nov. 27, 2001

(54) VEHICULAR SECURITY ACCESS SYSTEM

(76) Inventor: Sam Mog Son, 1627 C Mermaid Ave., Brooklyn, NY (US) 11224

( * ) Notice: Subject to any disclaimer, the term of this patent is extended or adjusted under 35 U.S.C. 154(b) by 43 days.

(21) Appl. No.: 09/585,796

(22) Filed: Jun. 3, 2000

(51) Int. Cl.[7] .................................................. B60R 25/10

(52) U.S. Cl. ............................................................ 340/426

(58) Field of Search ................................ 340/426, 425.5, 340/825.31, 825.32, 825.3, 575, 576, 573.1; 307/10.2; 382/115, 181

(56) References Cited

U.S. PATENT DOCUMENTS

| | | | | |
|---|---|---|---|---|
| 5,715,905 | * | 2/1998 | Kaman | 180/282 |
| 5,729,619 | * | 3/1998 | Puma | 382/115 |
| 5,812,067 | * | 9/1998 | Bergholz et al. | 340/825.31 |
| 5,832,183 | * | 11/1998 | Shinohara et al. | 395/22 |

* cited by examiner

*Primary Examiner*—Daryl Pope
(74) *Attorney, Agent, or Firm*—Michael I. Kroll

(57) ABSTRACT

The present invention 10 discloses an optical recognition vehicular security access system that will unlock the vehicles doors 20 and or trunk 36 by capturing an iris image pattern and performing a comparative analysis with a stored iris image pattern of the operator 12. Also the optical recognition vehicular security access system provides means whereby when the handle 18 of the vehicle 14 is grasped the interior lights will light and the camera 16 will pivot to capture an iris image of the individual 12. After comparative analysis of stored iris images the door 20 will be unlocked if an authorized match is found or an alarm 24 will be sounded. Furthermore, the optical recognition vehicular security access system has an interior audible alarm 24 that will be triggered by comparative analysis of real time images of the driver 12 with a stored image pattern to determine if the driver is falling asleep. The optical recognition vehicular security access system also has fiber optics cables 50 which are used to transport light in the visible and infrared spectrums to the camera 16 for capturing an image pattern to be used in comparative analysis of the stored image pattern. In addition, the optical recognition vehicular security access system has a programmable control keypad 30 which will be used to define characteristics of the system, such as, programming restriction parameters for an image. For example, a teenage driver could be coded for daylight driving only. Also the system provides an external keypad 26 which will provide access to the vehicle 14 without facial recognition such as, when a computer 28 failure occurs or inclement weather prevents the computer from recognizing the driver due to an ice or snow storm.

11 Claims, 10 Drawing Sheets

VEHICULAR SECURITY ACCESS SYSTEM

BACKGROUND OF THE INVENTION

Field of the Invention

The optical recognition vehicular security access system will provide means for capturing a iris image pattern to be used for future repetitive comparative analysis. The optical recognition vehicular security access system will provide means for storing a plurality of iris image patterns to be used in future repetitive comparative analysis. The optical recognition vehicular security access system will provide means for triggering the capture of an iris image pattern to be used for comparative analysis of a stored image pattern. The optical recognition vehicular security access system will provide means for triggering a near infrared lamp to be used in conjunction with a camera to capture an iris image pattern to be used for comparative analysis with a stored image pattern. The optical recognition vehicular security access system will provide means for generating an interior audible alarm. The optical recognition vehicular security access system will provide means for transporting light in the visible and infrared spectrums to a device for capturing an iris image pattern to be used in comparative analysis of a stored iris image pattern. The optical recognition vehicular security access system will provide means for unlocking the motor vehicle locking system based on the results of a comparative analysis of a captured iris image pattern with a stored iris image pattern. Also the optical recognition vehicular security access system provides means whereby when the handle of the vehicle is grasped the interior lights will light, the camera will pivot to capture an iris image of the individual, after comparative analysis of stored iris images the door will be unlocked if an authorized match is found or an alarm will be sounded.

The optical recognition vehicular security access system provides a battery backup as an alternate power source in case the car battery fails.

After entering the vehicle a switch located on the instrument panel will start the vehicle. The same switch will be depressed when the registered user selects to turn off the motor. At a predetermined time period after the occupant(s) leave the vehicle the alarm system will engage.

In addition, after recognition of the authorized user a button located inside the vehicle or exteriorly positioned near the trunk can be used to open the trunk.

DESCRIPTION OF THE PRIOR ART

There are other security devices designed for motor vehicles. Typical of these is U.S. Pat. No. 5,715,905 issued to Kaman on Feb. 10, 1998.

Another patent was issued to Bergholz et al. on Sep. 22, 1998 as U.S. Pat. No. 5,812,067. Yet another U.S. Pat. No. 5,832,183 was issued to Wataro Shinohara on Nov. 3, 1998 and still yet another was issued on Jan. 12, 1999 to Suzuki as U.S. Pat. No. 5,859,921.

U.S. Pat. No. 5,715,905 Inventor: Richard A. Kaman Issued: Feb. 10, 1998

The vehicular access controller includes input means for detecting an indicia of identity of a prospective user and central station control means for comparing the indicia of identity with an indicia of identity of an authorized user. The controller further includes activating means for activating the vehicle when the control means determines that the indicia of identity from the input means substantially matches the indicia of identity of the authorized user.

U.S. Pat. No. 5,812,067 Inventor: Ralf Bergholz Issued: Sep. 22, 1998

A system for recognizing authorization of a person to use a vehicle includes an optical-electronic image processor arranged to identify an authorized user of the vehicle by recognizing a distinctive physical feature of the user. The image processor provides an output signal which controls locking functions relating to operation of the vehicle based on a comparison of detected information with stored information relating to distinctive individual features of authorized users so that only authorized persons are enabled to use the vehicle.

U.S. Pat. No. 5,832,183 Inventor: Wataro Shinohara Issued: Nov. 3, 1998

An information recognition circuit comprises a plurality of recognition processing units each composed of a neural network. Teacher signals and information signals to be processed are supplied to a plurality of the units, individually so as to obtain output signals by executing individual learning. Thereafter, the plural units are connected to each other so as to construct a large scale information recognition system. Further, in the man-machine interface system, a plurality of operating instruction data are prepared. An operator's face is sensed by a TV camera to extract the factors related to the operator's facial expression. The neural network analogizes operator's feeling on the basis of the extracted factors. In accordance with the guessed results, a specific sort of the operating instruction is selected from a plurality of sorts of the operating instructions, and the selected instruction is displayed as an appropriate instruction for the operator. Further, the one-loop controller for automatizing operation comprises an input interface section for acquiring image information, an image recognition section for recognizing the image using the acquired image information, a control section for calculating control commands according to the image recognition results, and an output interface for outputting control commands to process actuators or subordinate controllers, respectively.

U.S. Pat. No. 5,859,921 Inventor: Hiroyoshi Suzuki Issued: Jan. 12, 1999

The invention provides an apparatus for processing an image of a face, capable of quickly and correctly detecting eyes not only under artificial illumination but also under sunlight regardless of the direction or altitude of the sun and regardless of circumstance conditions such as sunlight filtering down through trees, and still regardless of the variation in the face shape from person to person. An image of the face of a car driver is taken by a camera, and input to image signal input means. Gray level conversation means performs signal level conversion of picture elements of the face image received via the image signal input means in such a manner as to extract black-level areas smaller at least in the dimension along one image axis parallel or nearly parallel to the vertical direction of a face than a predefined length corresponding to the up-to-down width of an eye, thereby extracting black level areas having a size nearly equal to or less than the up-to-down width of the eye and thus extracting characteristic feature areas such as eyes, eyebrows, nares, and line between lips from the input face image. Variable binarization means converts the characteristic feature image into a binary image. Eye searching area setting means sets eye searching areas in the binary image. Candidate area setting means sets eye candidate areas in the eye searching areas. Eye area detection means detects eye area from the eye candidate areas. While these other security devices designed for motor vehicles may be suitable for the purposes for which they were designed, they would not be as suitable for the purposes of the present invention, as hereinafter described.

SUMMARY OF THE PRESENT INVENTION

The present invention discloses an optical recognition vehicular security access system that will unlock the vehicles doors and or trunk by capturing an iris image pattern and performing a comparative analysis with a stored iris image pattern of the operator. Also the optical recognition vehicular security access system provides means whereby when the handle of the vehicle is grasped the interior lights will light and the camera will pivot to capture an iris image of the individual. After comparative analysis of stored iris images the door will be unlocked if an authorized match is found or an alarm will be sounded. Furthermore, the optical recognition vehicular security access system has an interior audible alarm that will be triggered by comparative analysis of real time images of the driver with a stored image pattern to determine if the driver is falling asleep. The optical recognition vehicular security access system also has fiber optics cables which are used to transport light in the visible and infrared spectrums to the camera for capturing an image pattern to be used in comparative analysis of the stored image pattern. In addition, the optical recognition vehicular security access system has a programmable control keypad which will be used to define characteristics of the system, such as, programming restriction parameters for an image. For example, a teenage driver could be coded for daylight driving only. Also the system provides an external keypad which will provide access to the vehicle without facial recognition such as, when a computer failure occurs or inclement weather prevents the computer from recognizing the driver due to an ice or snow storm.

A primary object of the present invention is to provide a motor vehicle security system using the iris characteristics of one or more individuals to control the unlocking of the doors.

Another object of the present invention is to provide a motor vehicle alarm system using the stored iris image to perform a comparative analysis of a real time camera image.

Yet another object of the present invention is to provide a motor vehicle alarm system having an external keypad to provide emergency access to the interior of the vehicle due to inoperable conditions of the camera, such as computer failure or snow and ice covered windows.

Still yet another object of the present invention is to provide a motor vehicle security system that will use a motion sensor, near infrared lighting, and camera to capture an iris image for comparative analysis in performing the unlocking sequence of the motor vehicles doors and or trunk.

Another object of the present invention is to provide a motor vehicle security system that uses optical sensors, infrared lighting, and fiber optics to capture and transport an iris image to a central processor for comparative analysis in performing the unlocking sequence of the motor vehicles doors.

Yet another object of the present invention is to provide a motor vehicle alarm system using a camera to capture an iris image pattern for storage to be used in future comparative analysis in providing access to the unlocking of the motor vehicle.

Still yet another object of the present invention to provide a motor vehicle security system having an interior vehicle audible alarm.

Another object of the present invention is to provide a motor vehicle security system that will use a camera and near infrared lighting to capture an iris image pattern for comparative analysis with a stored iris image pattern to determine if an audible alarm should be initiated due to the driver of a moving vehicle falling asleep.

Yet another object of the present invention is to provide a motor vehicle security system whereby when the handle of the vehicle is grasped the interior lights will light, the camera will pivot to capture an iris image of the individual, and after comparative analysis of stored iris images the door will be unlocked if an authorized match is found or an alarm will be sounded.

Still yet another object of the present invention is to provide a motor vehicle security system having an interior vehicle programmable keypad.

Additional objects of the present invention will appear as the description proceeds.

The present invention overcomes the shortcomings of the prior art by providing an optical recognition vehicular security access system that will unlock the vehicles doors and or trunk by capturing an iris image pattern and performing a comparative analysis with a stored iris image pattern. The optical recognition vehicular security access system also provides means for storing a plurality of iris image patterns to be used in future repetitive comparative analysis. The optical recognition vehicular security access system provides means for triggering the capture of an iris image pattern using one or more motion detectors. Additionally the optical recognition vehicular security access system has an infrared lamp that will be triggered by the motion detector to provide lighting for capturing an iris image pattern by a camera that will be used for comparative analysis with a stored image pattern. Also the optical recognition vehicular security access system provides means whereby when the handle of the vehicle is grasped the interior lights will light, the camera will pivot to capture an iris image of the individual. After comparative analysis of stored iris images the door will be unlocked if an authorized match is found or an alarm will be sounded.

Furthermore, the optical recognition vehicular security access system has an interior audible alarm that will be triggered by comparative analysis of real time images of the driver with a stored image pattern to determine if the driver is falling asleep. The optical recognition vehicular security access system also has fiber optics cables which are used to transport light in the visible and infrared spectrums to the camera f6r capturing an image pattern to be used in comparative analysis of the stored image pattern. The optical recognition vehicular security access system has means for unlocking the motor vehicle locking system based on the results of comparative analysis of a captured physical facial characteristic image pattern with a stored physical facial image pattern.

In addition the optical recognition vehicular security access system has a programmable control keypad which will be used to define characteristics of the system, such as, programming restriction parameters for an image. For example, a teenage driver could be coded for daylight driving only. Also the system provides an external keypad which will provide access to the vehicle without facial recognition. Such as, when a computer failure occurs or inclement weather prevents the computer from recognizing the driver due to an ice or snow storm.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

Additionally the optical recognition vehicular security access system has an infrared lamp that will be triggered by the motion detector to provide lighting for capturing an iris image by a camera that will be used for comparative analysis with a stored image pattern.

Furthermore, the optical recognition vehicular security access system has an interior audible alarm that will be triggered by comparative analysis of real time images of the driver with a stored image pattern to determine if the driver is falling asleep or is sick and about to pass out.

The optical recognition vehicular security access system also has fiber optics cables which are used to transport light in the visible and infrared spectrums to the camera for capturing an image pattern to be used in comparative analysis of the stored image pattern.

The optical recognition vehicular security access system has means for unlocking the motor vehicle locking system based on the results of comparative analysis of a captured iris image pattern with a stored iris image pattern.

Further, the system has an external alternate access keypad which can be used to gain access to the motor vehicle without iris recognition in case of a computer failure or inclement weather such as iced or snow covered windows.

Figure 3:
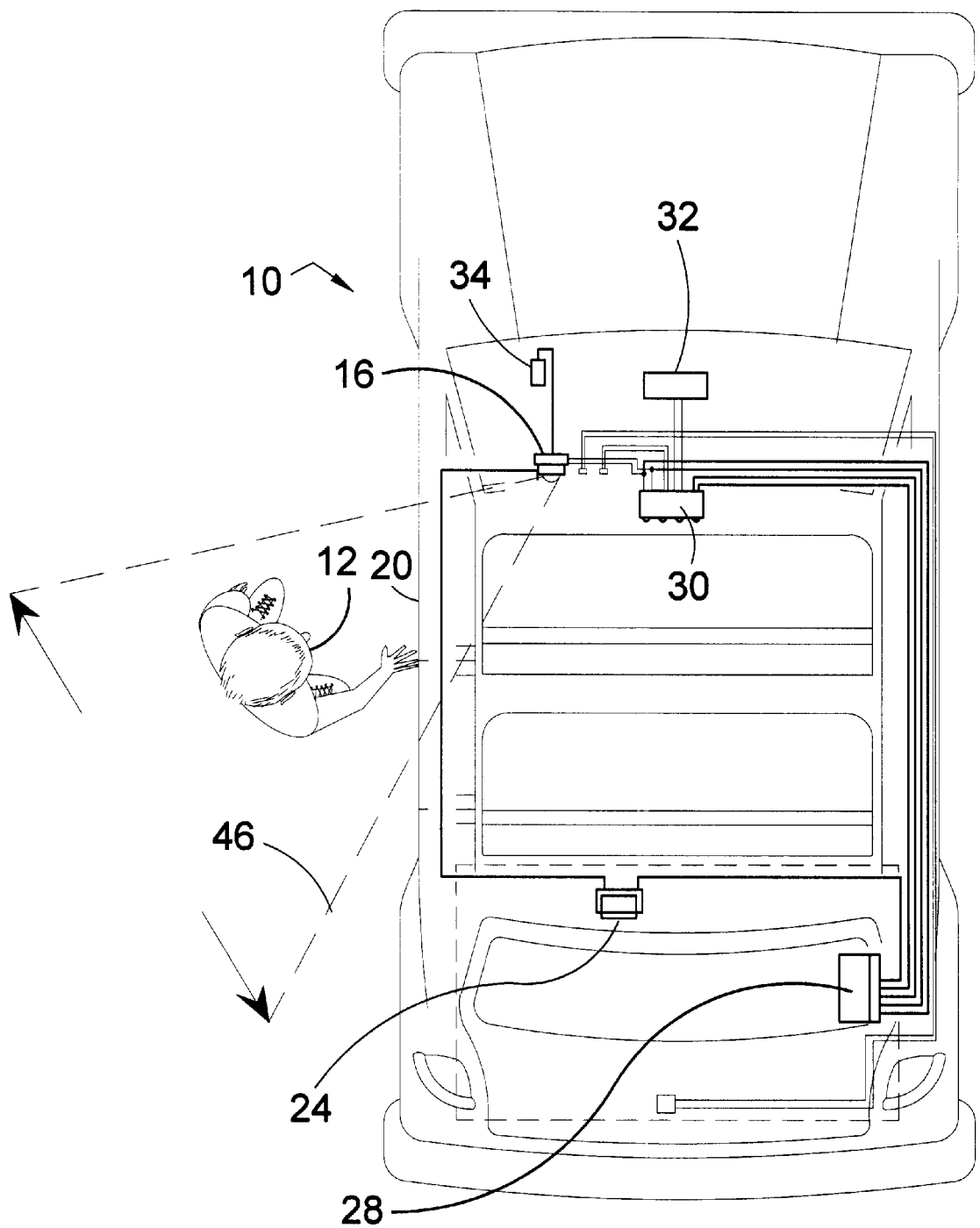

FIG. 3 is a top illustrative view of the present invention. Shown is the optical recognition vehicular security access system having a camera that detects the approaching individual. The camera captures an iris image pattern which is sent to a processing unit for comparative analysis with previously stored image patterns. Upon confirmation of image pattern recognition the system will unlock the vehicles doors.

Figure 4:
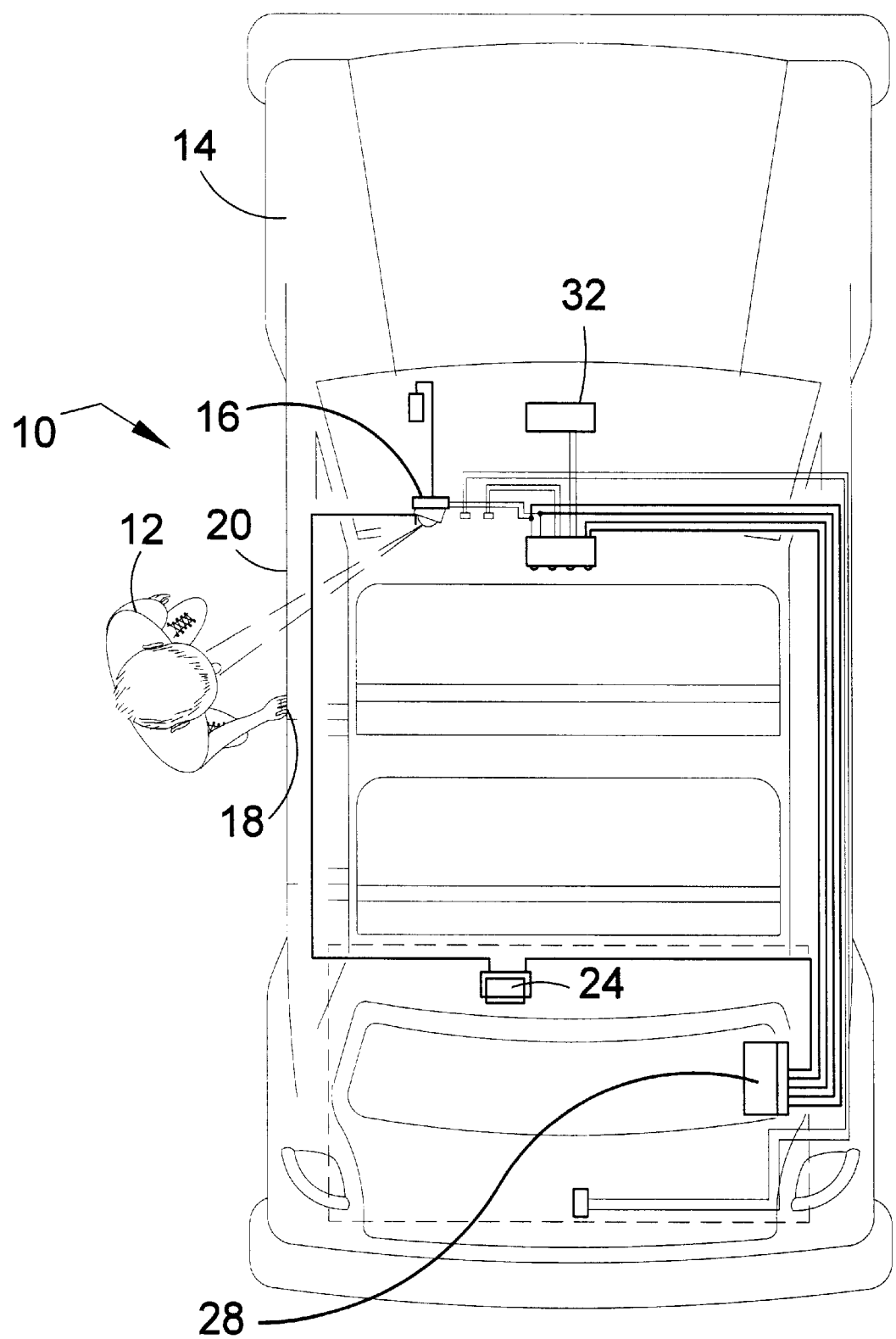

FIG. 4 is a top illustrative view of the present invention. Shown is the optical recognition vehicular security access system whereby when the handle of the vehicle is grasped the interior lights will light, the camera will pivot to capture an iris image of the individual, after comparative analysis of stored iris images the door will be unlocked if an authorized match is found or an alarm will be sounded.

Figure 5:
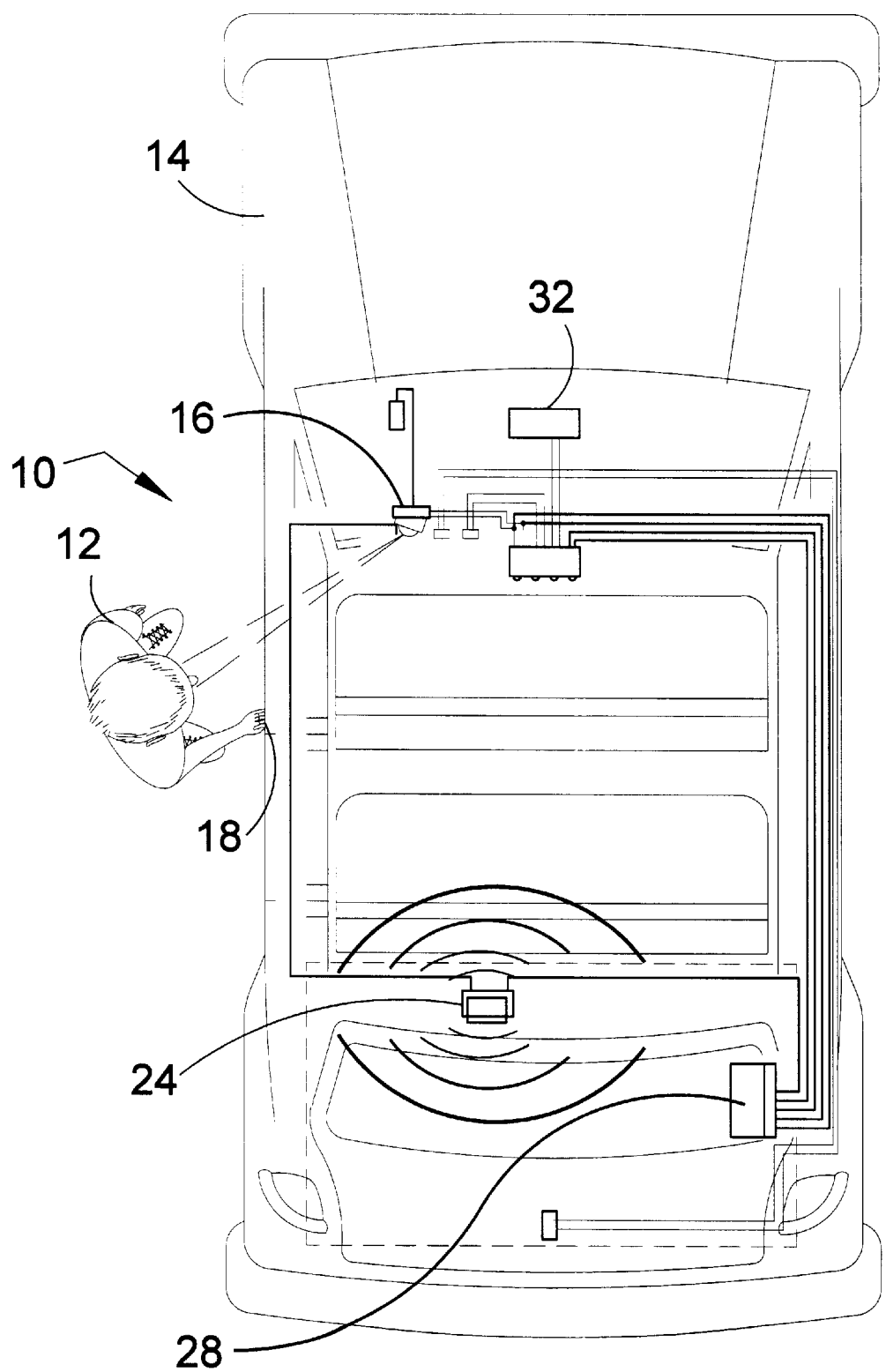

FIG. 5 is another top illustrative view of the present invention. Shown is the optical recognition vehicular security access system whereby when the handle of the vehicle is grasped the interior lights will light, the camera will pivot to capture an iris image of the individual, after comparative analysis of stored iris images the alarm will be sounded because of attempted unauthorized access to the vehicle.

Figure 6:
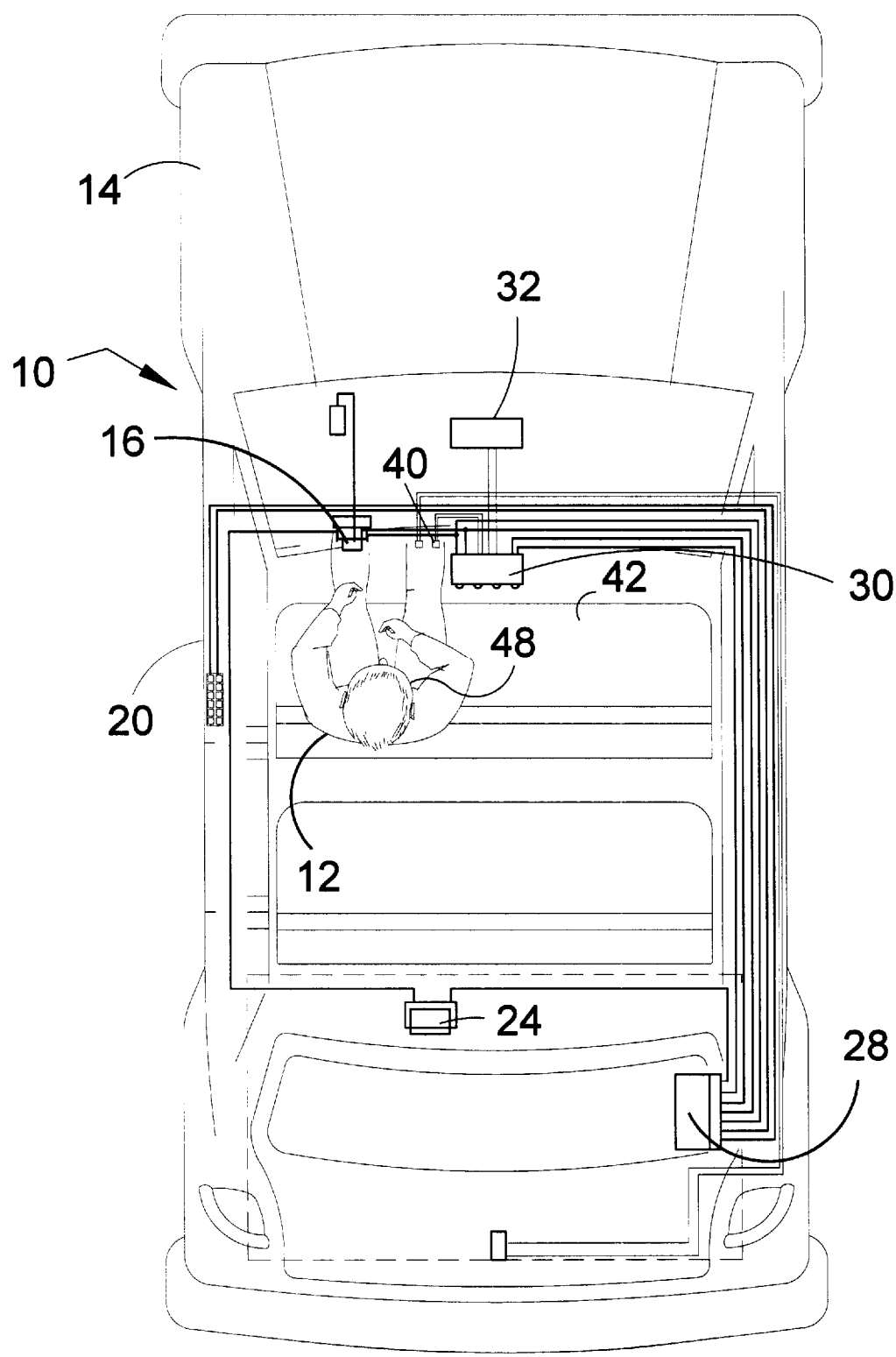

FIG. 6 is a continued top illustrative view of the optical recognition vehicular security access system which has performed a comparative analysis of the driver with a stored image pattern and has unlocked the vehicles doors. The driver positions themselves behind the wheel and engages a start button. The system determines that the driver is positioned within the drivers seat and the engine is turned on. While the vehicle is in motion the optical recognition vehicular security access system continuously scans the iris of the driver to determine the alertness of the driver. Should the system determine that the driver is in danger due to closing eyes or slumping in the seat which could be caused by illness, such as a heart attack, then the system having an interior audible alarm that will be triggered by comparative analysis of real time images of the driver with a stored image pattern to determine if the driver is falling asleep.

Figure 7:
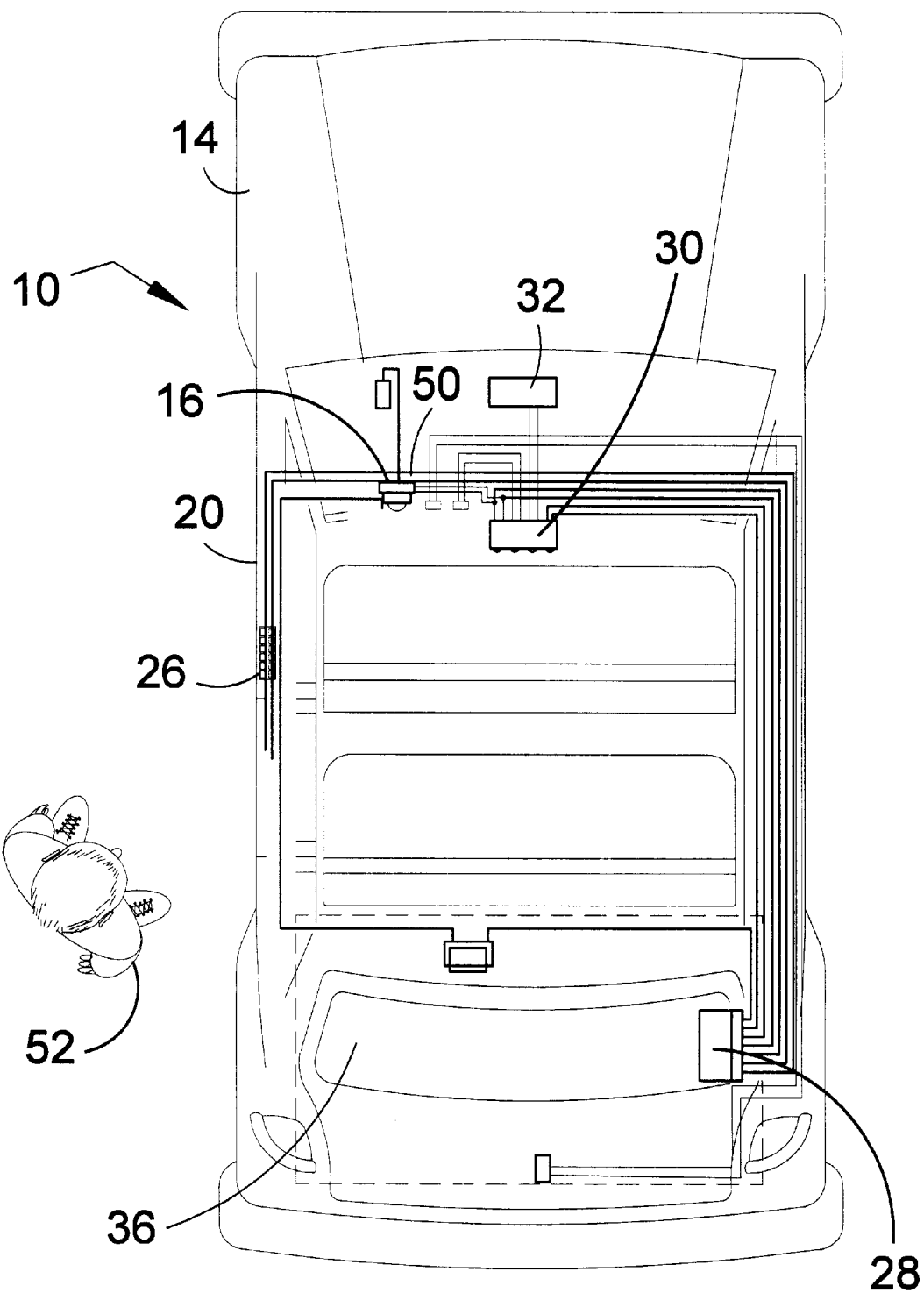

FIG. 7 is another top illustrative view of the present invention. Shown is the optical recognition vehicular security access system having fiber optics cables which are used to transport light in the visible and infrared spectrums to the camera for capturing an iris image pattern to be used in comparative analysis of the stored image pattern upon verification of the captured image pattern with a stored image pattern the trunk will be unlocked.

Also shown is an authorized valet attendant approaching the driver's door. The camera will attempt to identify any person within the camera focal length. If the driver is identified all locked access panels, such as doors, trunk, and hood will be unlocked. This will eliminate the need for keys.

In addition, the system provides for an external alternate access key pad which will provide access to the interior of the vehicle without stored iris recognition. This condition can be due to valet parking, equipment failure, or traffic accident, or weather conditions such as an ice or snow storm which can impede the camera from determining a focal length for the photo which will result in access being denied unless overridden by the alternate keypad.

Figure 8:
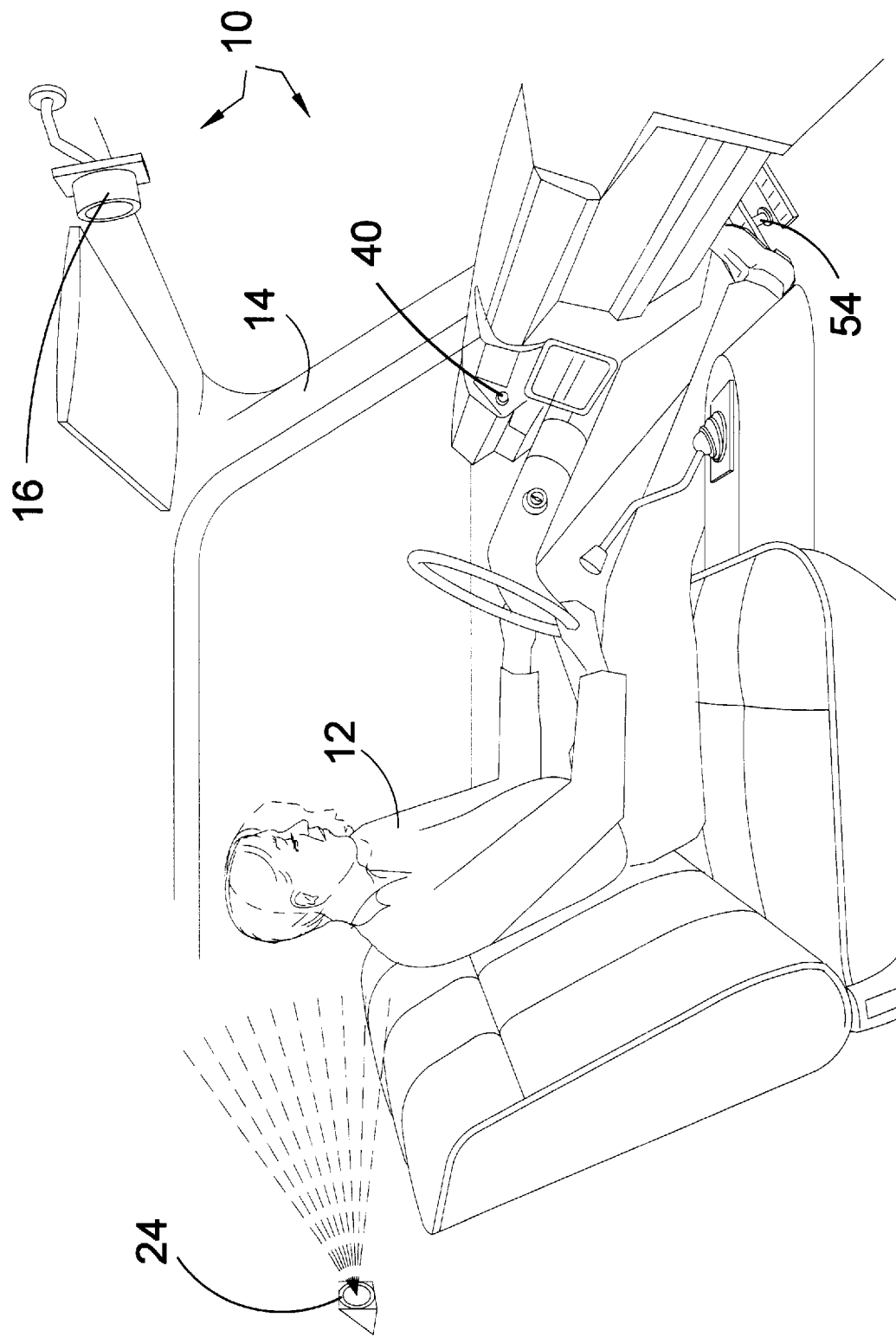

FIG. 8 is an interior illustrative view of the present invention. Shown is the optical recognition vehicular security access system having an interior audible alarm that will be triggered by comparative analysis of real time images of the driver with a stored image pattern to determine if the driver is falling asleep or is sick, such as a heart attack. The vehicle will determine there conditions by being unable to perform comparative analysis. In which case the system will engage the breaking system, bringing the vehicle to a halt. In addition, an audible alarm will be sounded to gain the attention of the driver.

Figure 9:
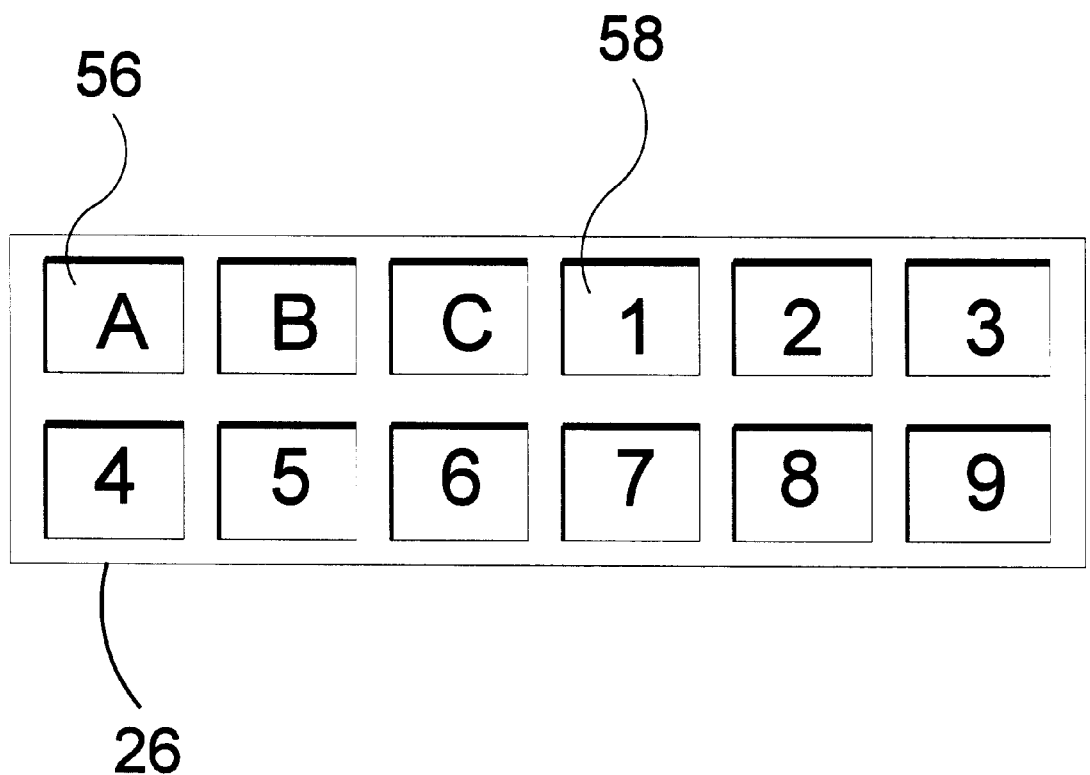

FIG. 9 is a front view of the alternate access keypad which can be used to gain access to the vehicles interior without having performed a comparative analysis. This may be necessary in the case of equipment failure such as, computer failure, or traffic accident. It can also be used to give other drivers driving privileges without entering the driver in the image directory.

Figure 10:
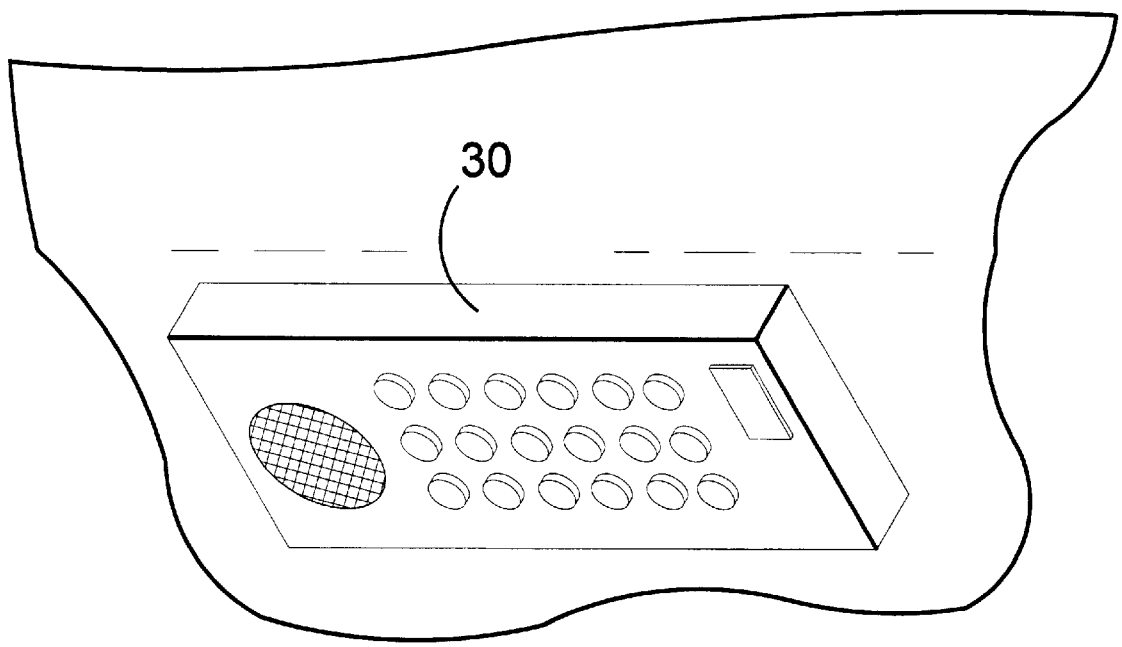

FIG. 10 is a perspective view of the programmable control keypad which can be used to instruct the security system to capture a number of images where a new driver is being added to the security system. It can also be used to add restriction to a driver on a temporary or permanent basis. The alternate driver could be restricted to operating the vehicle during specific hours. Also the system could be temporarily disabled, such as, when the vehicle is in for repair or a relative or friend is using the vehicle. It would not be necessary to add them to the image database just to drive to the store for a carton of milk.

LIST OF REFERENCE NUMERALS

With regard to reference numerals used, the following numbering is used throughout the drawings.
10 present invention
12 operator
14 vehicle
16 camera
18 handle
20 door
22 hand
24 audible alarm
26 external keypad
28 computer
30 control pad
32 battery backup
34 brake sensor
36 trunk
38 trunk switch
40 start switch
42 front seat
44 rear seat
46 field of view
48 face
50 cables
52 valet
54 brake pedal
56 alpha pads
58 numeric pads

DESCRIPTION OF THE PREFERRED EMBODIMENT(S)

In order that the invention may be more fully understood, it will now be described, by way of example, with reference to the accompanying drawings in which FIGS. 1 through 10 illustrate the present invention being a vehicular security access system.

Figure 1:
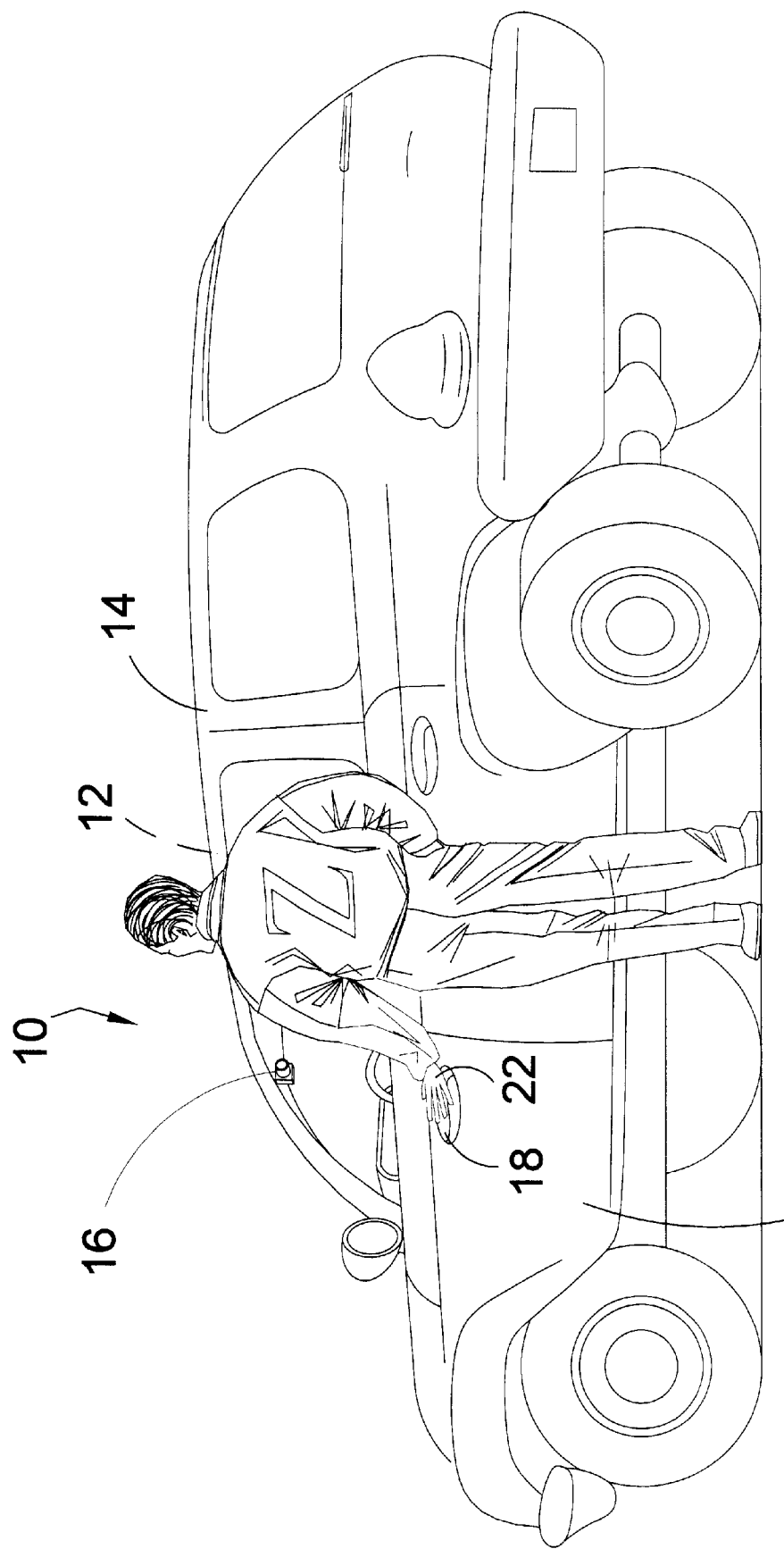
FIG. 1 is an illustrative view of the present invention in use. Shown is the motor vehicle operator approaching the motor vehicle. The optical recognition vehicular security access system will capture an iris image when the door handle is tried and perform a comparative analysis with previously stored iris images. If the optical recognition vehicular security access system confirms the captured iris image pattern with the stored iris image pattern the motor vehicles doors will be unlocked. If the optical recognition vehicular security access system detects insufficient ambient light to capture an image which can occur at night or dimly lit interiors such as parking garages than the system will use an infrared lamp to capture an iris image for comparative analysis. The optical recognition vehicular security access system eliminates the need for keys which can be lost. It also provides easier access for the physically challenged and would prevent unauthorized access to the vehicle even by family members. This system can be further enhanced by assigning parameters, through the programmable keypad, to entered images. It would be possible to allow a teenage family member to use the vehicle in a restricted time frame by assigning certain hours for their use.

Turning to FIG. 1, shown therein is an illustrative view of the present invention 10 in use. Shown is the motor vehicle operator 12 approaching the motor vehicle 14. The optical recognition vehicular security access system camera 16 will capture in real time an iris image of the potential operator 12 when the door handle 18 is tried by the hand 22 of the potential operator, then the system will perform a comparative analysis with previously stored iris images of approved operators 12. If the optical recognition vehicular security access system confirms the captured iris image pattern with the stored iris image pattern the motor vehicles doors 12 will be unlocked. If the optical recognition vehicular security access system detects insufficient ambient light to capture an image which can occur at night or dimly lit interiors such as parking garages than the system will use an infrared lamp to capture an iris image for comparative analysis. The optical recognition vehicular security access system eliminates the need for keys which can be lost. It also provides easier access for the physically challenged and would prevent unauthorized access to the vehicle even by family members. This system can be further enhanced by assigning parameters, through the programmable keypad, to entered images. It would be possible to allow a teenage family member to use the vehicle in a restricted time frame by assigning certain hours for their use.

Figure 2:
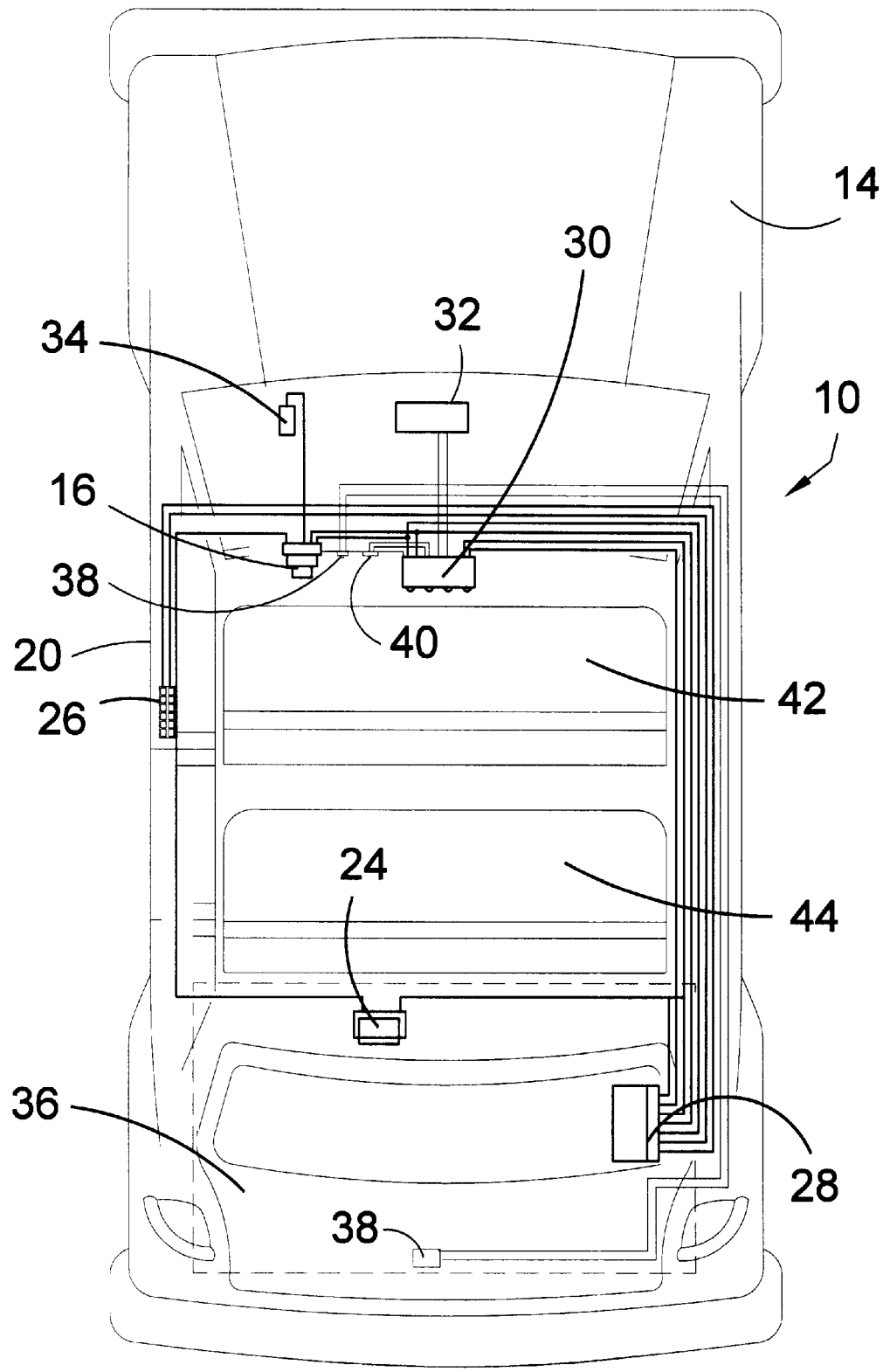
FIG. 2 is top illustrative view of the present invention. Shown is the optical recognition vehicular security access system that will unlock the vehicles doors by capturing an iris image pattern and performing a comparative analysis with a stored image pattern. The optical recognition vehicular security access system also provides means for storing a plurality of iris image patterns to be used in future repetitive comparative analysis. The optical recognition vehicular security access system provides means for triggering the capture of an iris image pattern using one or more motion detectors.

Turning to FIG. 2, shown therein is top illustrative view of the present invention 10. Shown is the optical recognition vehicular security access system that will unlock the vehicles doors 20 by capturing an iris image pattern and performing a comparative analysis with a stored image pattern. The optical recognition vehicular security access system also provides means for storing a plurality of iris image patterns to be used in future repetitive comparative analysis. The optical recognition vehicular security access system provides means for triggering the capture of an iris image pattern using one or more motion detectors. A programmable control pad 30 for the system is shown having battery backup 32 along with a brake sensor 34. Additionally the optical recognition vehicular security access system has an infrared lamp that will be triggered by the motion detector to provide lighting for capturing an iris image by a camera 16 that will be used for comparative analysis with a stored image pattern. Furthermore, the optical recognition vehicular security access system has an interior audible alarm 24 that will be triggered by comparative analysis of real time images of the driver with a stored image pattern to determine if the driver is falling asleep or is sick and about to pass out. The optical recognition vehicular security access system also has fiber optics cables which are used to transport light in the visible and infrared spectrums to the camera 16 for capturing an image pattern to be used in comparative analysis of the stored image pattern. The optical recognition vehicular security access system has means for unlocking the motor vehicle locking system based on the results of comparative analysis of a captured iris image pattern with a stored iris image pattern. Further, the system has an external alternate access keypad 26 which can be used to gain access to the motor vehicle 14 without iris recognition in case of a computer 28 failure or inclement weather such as iced or snow covered windows. Also shown are the trunk 36, trunk switch 38, start switch 40, front seat 42 and rear seat 44.

Turning to FIG. 3, shown therein is a top illustrative view of the present invention 10. Shown is the optical recognition vehicular security access system having a camera 16 that detects the approaching individual 12. The camera 16 captures an iris image pattern which is sent to a computer central processing unit 28 for comparative analysis with previously stored image patterns. Upon confirmation of image pattern recognition the system will unlock the vehicles doors 20. Also shown is a camera field of view 46 wherein the computer 28 will rotate the camera 16 in order to scan the operator 12. Also shown are the alarm 24 and battery backup 32. Other elements previously disclosed are also shown.

Turning to FIG. 4, shown therein is a top illustrative view of the present invention 10. Shown is the optical recognition vehicular security access system whereby when the handle 18 of the vehicle 14 is grasped the interior lights will light, the camera 16 will pivot or rotate to capture an iris image of the individual 12, after comparative analysis of stored iris images the door 20 will be unlocked if an authorized match is found or an alarm 24 will be sounded. Also shown are the computer 28 and battery backup 32.

Turning to FIG. 5, shown therein is another top illustrative view of the present invention 10. Shown is the optical recognition vehicular security access system whereby when the handle 18 of the vehicle 14 is grasped the interior lights will light, the camera 16 will pivot to capture an iris image of the individual 12, after comparative analysis of stored iris images the alarm 24 will be sounded because of attempted unauthorized access to the vehicle 14. Also shown are the computer 28 and battery backup 32.

Turning to FIG. 6, shown therein is a continued top illustrative view of the optical recognition vehicular security access system 10 which has performed a comparative analysis of the driver 12 with a stored image pattern and has unlocked the vehicles doors 20. The driver positions themselves behind the wheel and engages a start button 40. The system determines that the driver 12 is positioned within the driver's seat 42 and the engine is turned on. While the vehicle 14 is in motion the optical recognition vehicular security access system continuously scans the face 48 and iris of the driver 12 to determine the alertness of the driver. Should the system determine that the driver 12 is in danger due to closing eyes or slumping in the seat 42 which could be caused by illness, such as a heart attack, then the system having an interior audible alarm 24 that will be triggered by comparative analysis of real time images of the driver 12 with a stored image pattern to determine if the driver is falling asleep. Control pad 30 must be in auto mode for computer 28 controlled operation.

Turning to FIG. 7, shown therein is another top illustrative view of the present invention 10. Shown is the optical recognition vehicular security access system having fiber optics cables 50 which are used to transport light in the visible and infrared spectrums to the camera 16 for capturing an iris image pattern to be used in comparative analysis of the stored image pattern. Upon verification of the captured image pattern with a stored image pattern the trunk 36 will be unlocked. Also shown is an authorized valet 52 attendant approaching the driver's door 20. The camera 16 will attempt to identify any person within the camera focal length. If the driver is identified all locked access panels, such as doors, trunk 36, and hood will be unlocked. This will eliminate the need for keys. In addition, the system provides for an external alternate access key 26 pad which will provide access to the interior of the vehicle 14 without stored iris recognition. This condition can be due to valet parking, equipment failure, or traffic accident, or weather conditions such as an ice or snow storm which can impede the camera from determining a focal length for the photo which will result in access being denied unless overridden by the alternate keypad 26. Other elements previously disclosed are also shown.

Turning to FIG. 8, shown therein is an interior illustrative view of the present invention 10. Shown is the optical recognition vehicular security access system having a camera 16, an interior audible alarm 24 that will be triggered by comparative analysis of real time images of the driver 12 with a stored image pattern to determine if the driver is falling asleep or is sick, such as a heart attack. The computer 28 will determine these conditions by being unable to perform comparative analysis. In which case, the system will engage the breaking system, bringing the vehicle 14 to a halt. In addition, an audible alarm 24 will be sounded to gain the attention of the driver. Also shown are the start button 40 and brake pedal 54. After the alarm 24 is activated, the operator 12 is given a preset length of time within which to apply the brakes 54. If the driver does not respond in a timely manner, the computer will apply brakes, emergency flashers and open the driver's window.

Turning to FIG. 9, shown therein is a front view of the alternate access keypad 26 which can be used to gain access to the vehicles interior without having performed a comparative analysis. This may be necessary in the case of equipment failure such as, computer failure, or traffic accident. It can also be used to give other drivers driving privileges without entering the driver in the image directory. Pad 26 with both alpha 56 and numeric 58 pads provides over 60 million possible codes.

Turning to FIG. 10, shown therein is a perspective view of the programmable control keypad 30 which can be used to instruct the security system to capture a number of images where a new driver is being added to the security system. It can also be used to add restriction to a driver on a temporary or permanent basis. The alternate driver could be restricted to operating the vehicle during specific hours. Also the system could be temporarily disabled, such as, when the vehicle is in for repair or a relative or friend is using the vehicle. It would not be necessary to add them to the image database just to drive to the store for a carton of milk.

I claim:

1. In an apparatus for a vehicular security system, the vehicle having an operator's entry door with a door handle, an interior light, an operator's seat, brakes, and a start switch, the improvement comprising:

a) a camera for capturing a plurality of iris images of approved vehicle operators, said camera also operating in real time;

b) a computer, said computer having a central processing unit and an appropriate operating system;

c) means for storing a plurality of iris images in said computer;

d) means for comparing a plurality of iris images of approved operators stored in said computer with iris images captured in real time of potential operators before entering the vehicle whereby a match of the iris image of approved operators and potential operators is attempted by the computer, said camera having means for pivoting said camera across a predetermined filed of view outside of said vehicle, so as to focus on the eves of a potential operator;

e) means for unlocking the operator's door if a match of iris images between an approved operator and a potential operator is made; and, f) means for appropriately electrically connecting said camera, said computer, said means for storing, said means for comparing and said means for unlocking.

2. The apparatus of claim 1, further comprising means for unlocking the trunk of the vehicle if a match of iris images between an approved operator and a potential operator is made.

3. The apparatus of claim 1, further comprising means for unlocking the hood of the vehicle if a match of iris images between an approved operator and a potential operator is made.

4. The apparatus of claim 1, further comprising an audible alarm triggered if a match of iris images between an approved operator and a potential operator is not made.

5. The apparatus of claim 1, further comprising a programmable control pad capable of defining operational parameters of the system.

6. The apparatus of claim 1, further comprising an external keypad whereby entry is allowed into the vehicle if a match of iris images between an approved operator and a potential operator is not made.

7. The apparatus of claim 1, further comprising an infrared lamp, said lamp being turned on by low light conditions.

8. The apparatus of claim 1, further comprising a motion detector whereby inappropriate motion of the operator while positioned in the operator's seat triggers said means for comparing a plurality of iris images of the approved operator.

9. The apparatus of claim 8, wherein said motion detector further comprises means for opening a vehicular window if a match of iris images of the operator is not made.

10. The method of operating a vehicular security access system comprising the steps of:

a) using a camera mounted within a vehicle to capture iris images of a potential operator approaching the driver door of said vehicle, said camera operating in real time;

b) activating a computer within said vehicle to compare the iris images of said potential operator with a plurality of iris images of approved vehicle operators stored in said computer;

c) unlocking said driver door when the potential operator touches a door handle on the driver door if an iris match is made;

d) allowing said potential operator to start said vehicle by pressing a start button within said vehicle and becoming the driver of said vehicle;

e) monitoring continuously the iris images of the driver while the vehicle is being operated and issuing an alarm if the driver's are closed indicating the existence of danger; and f) operating a keypad to add or subtract authorized drivers and establishing the parameters of operation of said vehicle by particular drivers on a permanent or temporary basis.

11. The apparatus of claim 8, wherein said motion detector further comprises means for applying the vehicle brakes after a predetermined length of time if a match of iris images of the operator is not made.

* * * * *